US008601459B2

(12) United States Patent
Sankaranarayanan et al.

(10) Patent No.: US 8,601,459 B2
(45) Date of Patent: *Dec. 3, 2013

(54) CONTROL STRUCTURE REFINEMENT OF LOOPS USING STATIC ANALYSIS

(71) Applicant: NEC Laboratories America, Inc., Princeton, NJ (US)

(72) Inventors: Sriram Sankaranarayanan, Boulder, CO (US); Aarti Gupta, Princeton, NJ (US); Gogul Balakrishnan, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,010

(22) Filed: Apr. 9, 2013

(65) Prior Publication Data
US 2013/0227537 A1 Aug. 29, 2013

Related U.S. Application Data

(63) Continuation of application No. 12/701,962, filed on Feb. 8, 2010.

(60) Provisional application No. 61/150,981, filed on Feb. 9, 2009.

(51) Int. Cl.
G06F 9/45 (2006.01)
G06F 9/44 (2006.01)

(52) U.S. Cl.
USPC ........... 717/160; 717/150; 717/151; 717/167; 717/170; 717/178

(58) Field of Classification Search
USPC .................. 717/150, 151, 160, 167, 171, 178
See application file for complete search history.

(56) References Cited

U.S. PATENT DOCUMENTS

| | | | | |
|---|---|---|---|---|
| 7,631,305 | B2 * | 12/2009 | Rong et al. | 717/161 |
| 7,761,847 | B2 * | 7/2010 | Kornerup et al. | 717/113 |
| 7,793,278 | B2 * | 9/2010 | Du et al. | 717/160 |
| 8,171,438 | B2 * | 5/2012 | Ward | 716/104 |
| 8,285,670 | B2 * | 10/2012 | Chen et al. | 707/609 |
| 2005/0050515 | A1 * | 3/2005 | Shah et al. | 717/113 |
| 2005/0097509 | A1 * | 5/2005 | Rong et al. | 717/106 |
| 2006/0026560 | A1 * | 2/2006 | Kornerup et al. | 717/113 |
| 2008/0127106 | A1 * | 5/2008 | Ward | 717/127 |
| 2009/0307655 | A1 * | 12/2009 | Pingali et al. | 717/106 |
| 2010/0199257 | A1 * | 8/2010 | Biggerstaff | 717/104 |
| 2010/0306733 | A1 * | 12/2010 | Bordelon et al. | 717/106 |

* cited by examiner

*Primary Examiner* — Idriss N Alrobaye
*Assistant Examiner* — Getente A Yimer
(74) *Attorney, Agent, or Firm* — Joseph Kolodka

(57) ABSTRACT

A system and method for discovering a set of possible iteration sequences for a given loop in a software program is described, to transform the loop representation. In a program containing a loop, the loop is partitioned into a plurality of portions based on splitting criteria. Labels are associated with the portions, and an initial loop automaton is constructed that represents the loop iterations as a regular language over the labels corresponding to the portions in the program. Subsequences of the labels are analyzed to determine infeasibility of the subsequences permitted in the automaton. The automaton is refined by removing all infeasible subsequences to discover a set of possible iteration sequences in the loop. The resulting loop automaton is used in a subsequent program verification or analysis technique to find violations of correctness properties in programs.

12 Claims, 4 Drawing Sheets

CONTROL STRUCTURE REFINEMENT OF LOOPS USING STATIC ANALYSIS

RELATED APPLICATION INFORMATION

This application is a continuation of co-pending U.S. patent application Ser. No. 12/701,962, filed on Feb. 8, 2010, which claims priority to provisional application Ser. No. 61/150,981, filed on Feb. 9, 2009, the contents of both of which are incorporated herein by reference.

BACKGROUND

1. Technical Field

The present invention relates to computer program verification and more particularly to systems and methods for analyzing a loop in a program.

2. Description of the Related Art

Many static analysis and verification techniques do not perform well on loops in programs, either due to loss of precision or due to state space explosion. Many attempts have been made to address this problem. These attempts include a guided static analysis approach. This approach uses an abstract interpretation along loop paths to discover a refined control flow structure of a loop as a means of improving the precision of the final solution of the abstract interpretation itself.

A variance analysis approach uses the control flow of the loops to discover a set of ranking functions to prove termination of programs. These approaches, while providing some improvements, do not protect against state space explosion or provide the needed precision to sufficiently analyze loops.

SUMMARY

A system and method for discovering a set of possible iteration sequences for a given loop in a software program is described to transform the loop representation. In a program containing a loop, the loop is partitioned into a plurality of portions based on splitting criteria such as outcome of branches in the loop, back edges traversed by the iteration, induction variable updates, and so on. Labels are associated with the portions, and an initial loop automaton is constructed that represents the loop iterations as a regular language over the labels corresponding to the portions in the program. Subsequences of these labels that are infeasible during any program execution are determined by analyzing the program. The loop automaton is refined by removing all infeasible subsequences to discover a set of possible iteration sequences in the loop. The resulting loop automaton is used in a subsequent program verification or analysis technique to find violations of correctness properties in programs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
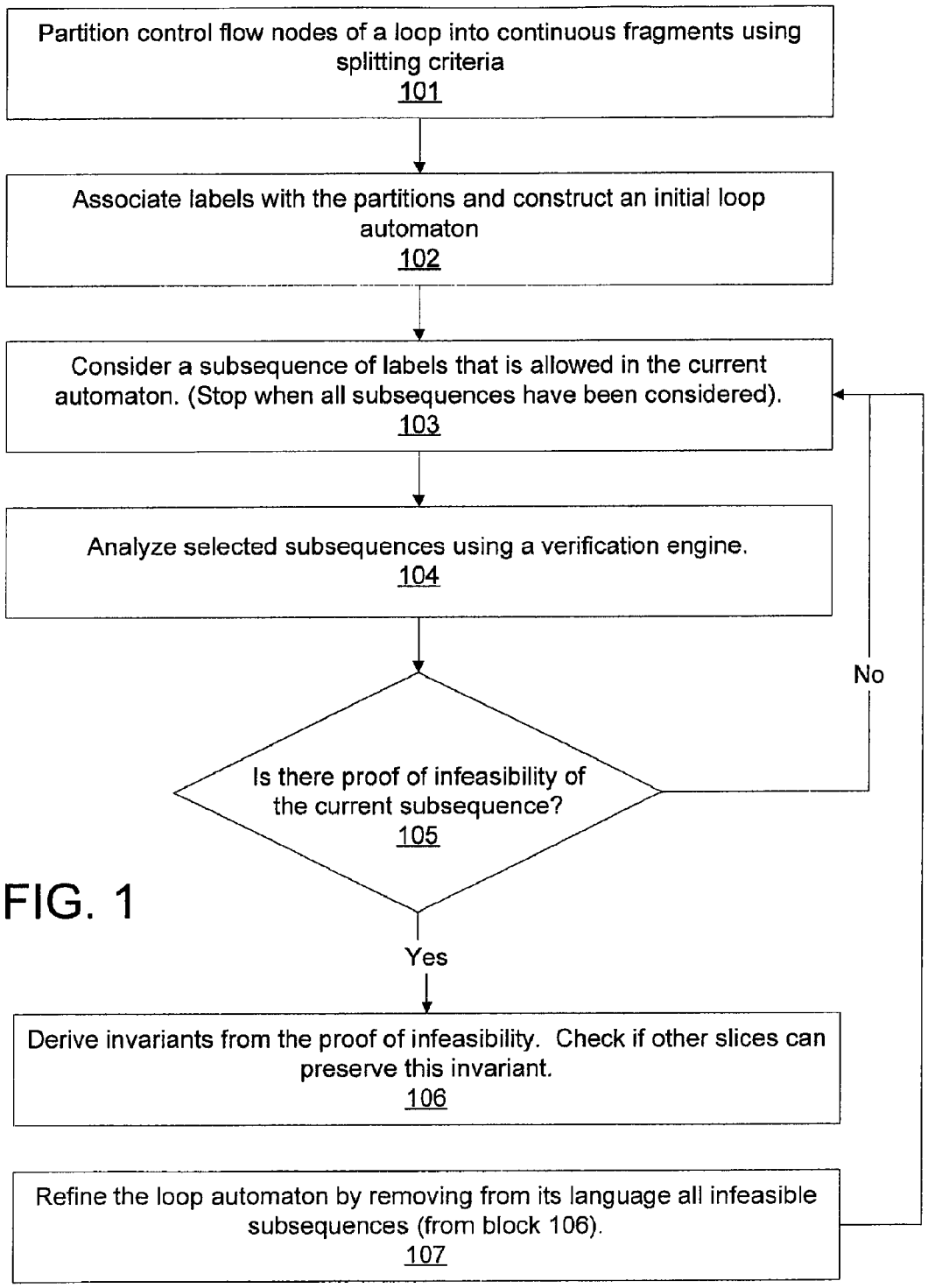
FIG. 1 is a block/flow diagram of a system/method for discovering a set of possible iteration sequences in a given loop in accordance with one embodiment.

In accordance with the present principles, a technique for analyzing control flow patterns in loops of imperative programs is provided. Such loops are common in embedded controllers that are generated automatically from a synchronous programming language. A simple yet useful technique is disclosed for refining the control structure of these loops. Such a refinement makes the structure of the loop explicit by identifying a set of possible iterative sequences in any execution. This permits a gain in precision during the subsequent application of other program analyses and verification techniques, such as abstract interpretation, model checking, etc.

The technique analyzes control flow patterns inside complex loops. The technique refines the control structure of loops using a set of labels to distinguish different control paths inside a given loop. The iterations of the loop are abstracted as a finite state automaton over these labels. We then present static analysis techniques to refine the loop by refining the language of this finite state automaton. Such refinement enables numerous applications such as a means of dovetailing static analyses for controlling the precision loss due to widening, identifying potentially non-terminating sequences and potentially improving techniques proving termination.

The set of labels are employed to distinguish between different control paths inside a given loop. The iterations of the loop are then abstracted as a finite state automaton over these labels. We use static analysis techniques to discover forbidden iteration subsequences, i.e., contiguous path segments that can never occur in any execution of the loop. Such forbidden subsequences are subtracted from the initial loop language to obtain a refinement. This refinement improves precision of other static analysis techniques that can be applied subsequently.

Embodiments described herein may be entirely hardware, entirely software or including both hardware and software elements. In a preferred embodiment, the present invention is implemented in software, which includes but is not limited to firmware, resident software, microcode, etc. The software is loaded onto computers and executed to analyze a program. The program code is stored on a computer readable medium and can be analyzed from the computer readable medium by one or more processors or by software working with one or more processors.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Referring now to the drawings in which like numerals represent the same or similar elements and initially to FIG. 1, a block/flow diagram of a system/method for analyzing loops in accordance with the present principles is illustratively shown. In block 101, a loop of a program is considered. The loop is partitioned based on splitting criteria, such as outcome of branches in the loop, back edges traversed by the iteration, induction variable updates, and so on, into continuous fragments. A continuous fragment S between nodes $n_0$ and $n_f$ is a set of nodes $N_S$ and a set of edges $E_S$ such that all nodes in $N_S$ are reachable from $n_0$ through the edges in $E_S$ and $n_f$ is reachable from all nodes in $N_S$ through the edges in $E_S$.

In block 102, labels are associated with the partitions in block 101. An initial loop automaton is constructed. An automaton is a mathematical model for a finite state machine (FSM). An FSM is a machine that takes a symbol as input and "jumps" or transitions, from one state to another according to a transition function (which can be expressed as a table). In the automaton, the labels correspond to code in the partitions of the loop. The set of labels are employed to distinguish between different control paths inside a given loop. The iterations of the loop are then abstracted as a finite state automaton over these labels.

In block 103, a subsequence of labels that are allowed in the automaton are considered. This step acts as a check to ensure that all subsequences are considered before termination of the program. In block 104, a verification engine is employed to analyze a selected subsequence. The verification engine determines whether a given subsequence is feasible or infeasible. The verification tool may include, e.g., a static analyzer, a model checker, or a constraint solver. The verification engine/tool generates proof for a verified property. Static analysis techniques are preferably employed to discover forbidden iteration subsequences, i.e., contiguous path segments that can never occur in any execution of the loop.

In block 105, a determination is made as to whether proof of infeasibility exists for the selected/given subsequence. If there is no proof of infeasibility the program path returns to block 103 to consider the next subsequence. If there is proof of infeasibility, the program path continues to block 106. In block 106, invariants are derived from the proof of infeasibility. A predicate is called an invariant to a sequence of operations if the predicate always evaluates at the end of the sequence to the same value as before starting the sequence. The invariants are checked to see if other subsequences preserve the invariant. If there are other subsequences that preserve the invariant, then these subsequences can be used to expand the original subsequence. For example, suppose the subsequence $s_1 s_2$ is infeasible and $\phi$ is the invariant that holds at the point between $s_1$ and $s_2$. If subsequence $s_3$ preserves the invariant $\phi$ then the subsequence $s_1 s_3^* s_2$ is also infeasible. ($s_3^*$ means zero or more occurrences of $s_3$ in the sequence.)

In block 107, the loop automaton is updated by removing from its language all infeasible subsequences derived in block 106. Forbidden subsequences (infeasible) are subtracted from the initial loop language to obtain a refinement. This refinement improves precision of other static analysis techniques that can be applied subsequently. For example, consider FIG. 3. An original control flow graph (CFG) 302 is shown, and a refined CFG 305 is shown. If we use static analysis to determine the possible value ranges for variable x at the loop head, the static analysis will compute the range $(-\infty,\infty)$ for the CFG 302. The same static analysis computes a more precise range [10,11] for the CFG 305.

The present approach enables higher quality static analysis especially in loops, thereby improving static analysis results and obtaining efficient ways for finding proofs or violations of program properties. The present principles present an expanded control structure of the loop that enables reverse engineering of logic and exposes hazards such as potential non-termination.

In accordance with the present principles, sub-sequences are employed as targets for refinement. Rather than proving that no path may visit a given set of blocks, the present embodiments reason about a set of fragments that occur in a particular order. This way of approaching the problem is more appropriate for reasoning about loops. Further, we expect infeasible paths of the form discovered by the present technique to be more common than finding nodes that may not be visited at all. In comparison to the prior art, we provide a systematic approach that will discover a useful refinement of the loop structure on which widening may be applied to obtain better results. Widening is a technique used in abstract interpretation to ensure termination in the presence of loops. Widening ensures termination by extrapolating the results for loop heads by observing the results at the loop heads for a few iterations.

The present embodiments further provide language refinement to remove infeasible paths. As compared to other approaches for disjunctive analysis, we enable precise refinements by deriving structural information about the loop iterations. For example, in the example shown in FIG. 3, the loop structure is refined structurally to show after execution partition s1, the loop must exit or partition s2 must be executed.

Figure 2:
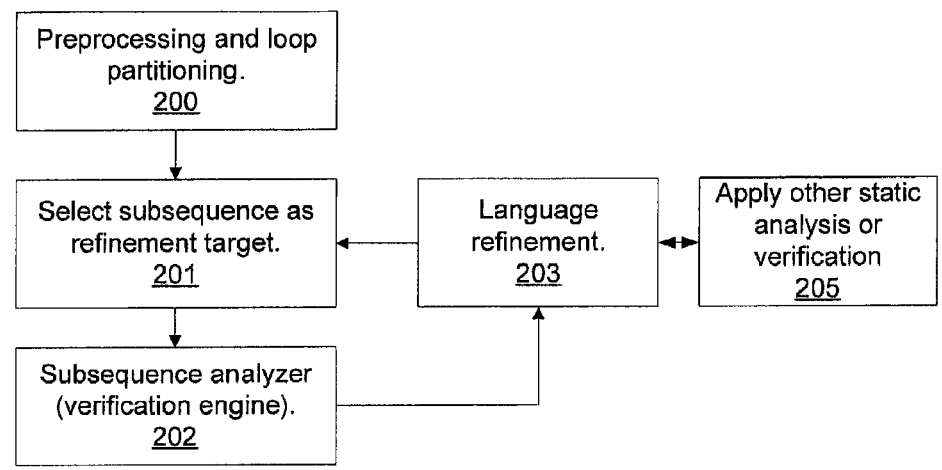
FIG. 2 is a block/flow diagram of a system/method for discovering a set of possible iteration sequences in a given loop in accordance with another embodiment.

Referring to FIG. 2, a block/flow diagram of a system/method for analyzing loops in accordance with the present principles is illustratively shown. In block 200, preprocessing and loop partitioning are performed on a program having a loop. In block 201, subsequences are selected as a refinement target. In block 202, a subsequence analyzer (or verification engine) is employed to analyze the subsequences to determine invariants in the subsequence. In block 203, language refinement is performed to remove invariants. At this point, other analyses may be employed to check/verify the program in block 205. Such analyses may include a static analyses, verification, etc. In accordance with the present principles, the present embodiments may be employed to check a program for non-termination, improve precision of static analysis, check typestates, etc.

Figure 3:
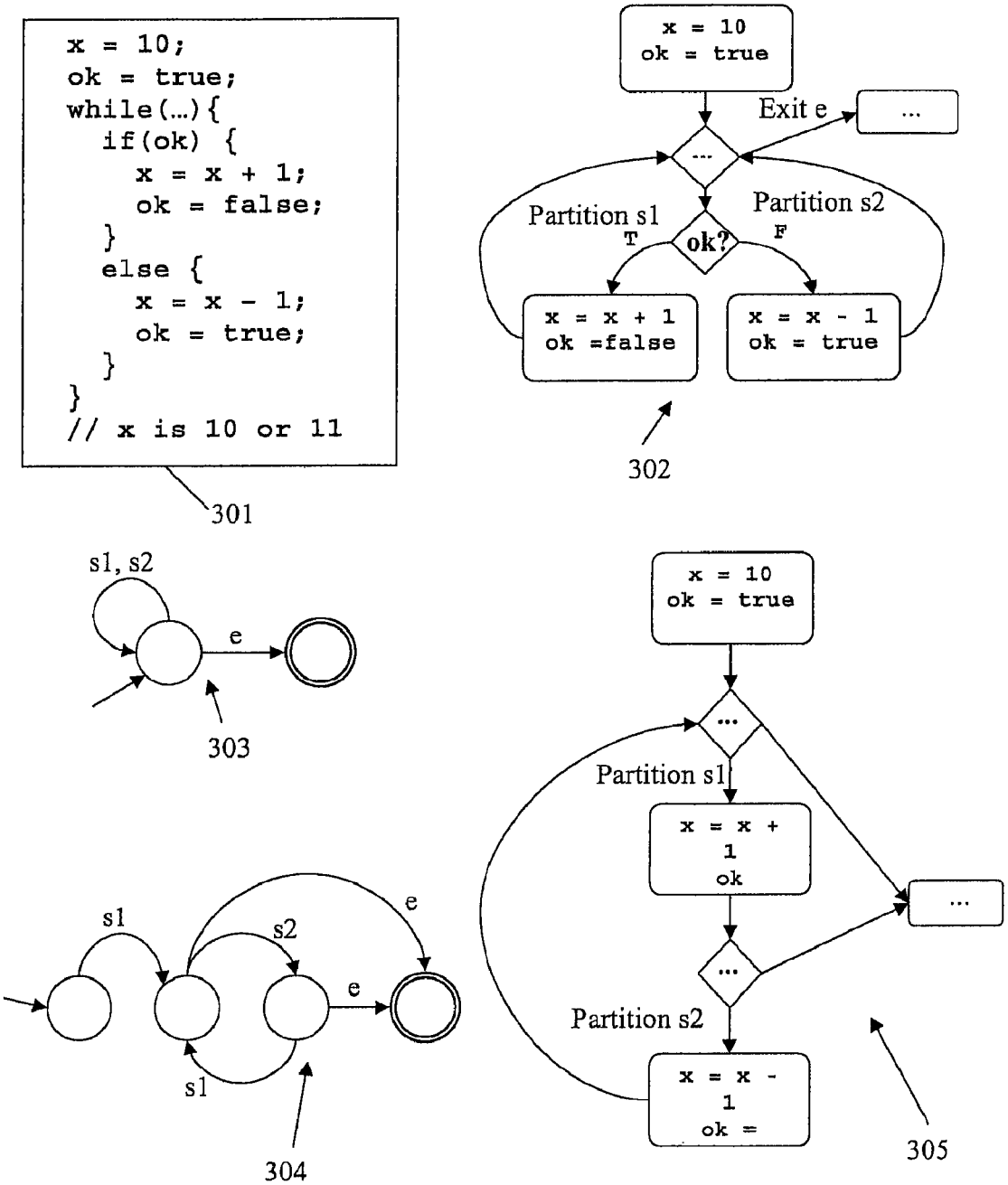
FIG. 3 is an example to illustrate the system/method for discovering a set of iterative possible iteration sequences.

FIG. 3 shows an example that illustrates the system/method to determine the set of possible iteration sequences for loops in the program. An example program 301 includes a loop. The loop is such that the value of a variable on exiting the loop is either 10 or 11. The control flow graph (CFG) 302 is shown along with loop partitions and the partition labels s1, s2 and e. A finite state automaton 303 represents the iterations of the loop using the partition labels. The double circles in FIG. 3 represent an accepting state. A refined automaton 304 is obtained after removing infeasible subsequences s1* and s2*. A CFG 305 is obtained by refining the loop using the refined automaton 304. The example depicted is for illustrative purposes and should not be construed as limiting the present invention.

Figure 4:
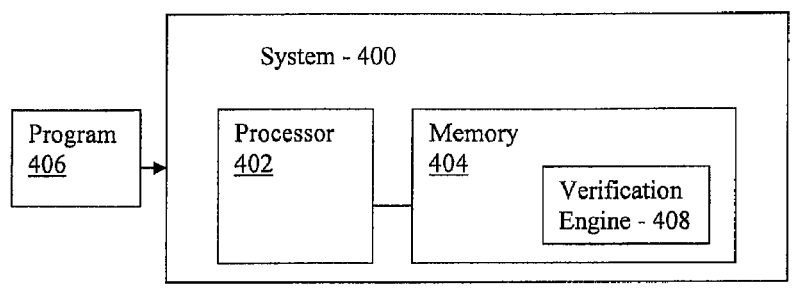
FIG. 4 is a block diagram showing a basic system for implementing the present embodiments.

Referring to FIG. 4, a system 400 includes a processor 402 and memory 404 for program verification. A program 406 having a loop is input into the system 400 (see e.g., FIG. 3). The processor 402 and memory 404 are configured to execute the methods in accordance with the present principles. The memory 404 stores a verification engine 408, which is executed to provide static analysis. The program 406 is analyzed/verified. If warning are issued the system and/or a user may make corrections or adjustments to the program 406 accordingly through user interfaces (not shown).

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for discovering a set of possible iterative sequences for a given loop in a program, the method comprising:

partitioning the loop into a plurality of portions based on control flow in the loop, each of the plurality of portions representing multiple paths in the control flow;

associating labels with the portions, loop iterations being abstracted as a finite state automaton over the labels;

constructing an initial loop automaton in memory storage that represents the loop iterations as a regular language over the labels corresponding to the portions in the program;

analyzing subsequences of the labels to determine infeasibility of the subsequences permitted in the automaton; and refining the loop automaton by removing all infeasible subsequences to discover a set of possible iteration sequences, wherein partitioning the loop into a plurality of portions includes partitioning the loop using splitting criteria including one or more of outcome of branches in the loop, back edges traversed by an iteration, and induction variable updates.

2. The method as recited in claim 1, wherein analyzing subsequences of the labels includes determining whether there is a proof of infeasibility in a current subsequence; and if proof exists, deriving invariants from the proof.

3. The method as recited in claim 2, wherein refining the automaton includes checking invariants to determine whether other subsequences can preserve the invariant, if preserved, then expanding the original infeasible subsequence.

4. The method as recited in claim 1, wherein analyzing subsequences of the labels includes verifying properties of the subsequences using a static analyzer.

5. The method as recited in claim 4, wherein verifying properties of the subsequences includes generating proof of a property verified.

6. The method as recited in claim 1, further comprising using the refined loop automaton in subsequent program analysis to determine violations of correctness properties in the program.

7. A non-transitory computer readable storage medium comprising a computer readable program for discovering a set of possible iterative sequences for a given loop in a program, wherein the computer readable program when executed on a computer causes the computer to perform the steps of:

partitioning the loop into a plurality of portions based on control flow in the loop, each of the plurality of portions representing multiple paths in the control flow;

associating labels with the portions, loop iterations being abstracted as a finite state automaton over the labels;

constructing an initial loop automaton that represents loop iterations as a regular language over the labels corresponding to the portions in the program;

analyzing subsequences of the labels to determine infeasibility of the subsequences permitted in the automaton; and refining the loop automaton by removing all infeasible subsequences to discover a set of possible iteration sequences, wherein partitioning the loop into a plurality of portions includes partitioning the loop using splitting criteria including one or more of outcome of branches in the loop, back edges traversed by an iteration, and induction variable updates.

8. The non-transitory computer readable storage medium as recited in claim 7, wherein analyzing subsequences of the labels includes determining whether there is a proof of infeasibility in a current subsequence; and if proof exists, deriving invariants from the proof.

9. The non-transitory computer readable storage medium as recited in claim 8, wherein refining the automaton includes checking invariants to determine whether other subsequences can preserve the invariant, if preserved, then expanding the original infeasible subsequence.

10. The non-transitory computer readable storage medium as recited in claim 7, wherein analyzing subsequences of the labels includes verifying properties of the subsequences using a static analyzer.

11. The non-transitory computer readable storage medium as recited in claim 10, wherein verifying properties of the subsequences includes generating proof of a property verified.

12. The non-transitory computer readable storage medium as recited in claim 7, wherein the computer readable program when executed on the computer further causes the computer to perform the step of:

using the refined loop automaton in subsequent program analysis to determine violations of correctness properties in the program.

* * * * *